United States Patent [19]

Kemper et al.

[11] Patent Number: 4,872,362
[45] Date of Patent: Oct. 10, 1989

[54] DRIVING MECHANISM AND MANIPULATOR COMPRISING SUCH A DRIVING MECHANISM

[75] Inventors: Nicolaas R. Kemper; Henricus J. J. Bouwens; Marinus P. Koster, all of Eindhoven; Willem L. G. De Peuter, Oegstgeest, all of Netherlands

[73] Assignee: U.S. Philips Corporation, New York, N.Y.

[21] Appl. No.: 327,412

[22] Filed: Mar. 22, 1989

Related U.S. Application Data

[63] Continuation of Ser. No. 136,582, Dec. 22, 1987, abandoned.

[30] Foreign Application Priority Data

May 18, 1987 [NL] Netherlands .......................... 8701183

[51] Int. Cl.$^4$ ...................... F16H 25/24; F16H 55/24; B25J 17/00
[52] U.S. Cl. ..................................... 74/479; 74/89.15; 74/424.8 B; 74/441; 74/459; 901/21; 901/23; 901/25
[58] Field of Search ................... 74/424.8 B, 441, 459, 74/424.8 R, 89.15, 479; 901/21, 23, 24, 25

[56] References Cited

U.S. PATENT DOCUMENTS

| | | | |
|---|---|---|---|
| 2,860,266 | 11/1958 | Schrader | 74/424.8 B |
| 3,331,257 | 7/1967 | Gerber | 74/441 X |
| 3,407,680 | 10/1968 | Westmoreland | 74/424.8 B |
| 4,274,296 | 6/1981 | Miller et al. | 74/459 X |
| 4,518,298 | 5/1985 | Yasukawa | 414/4 |
| 4,706,515 | 11/1987 | Yasukawa | 901/21 X |
| 4,730,503 | 3/1988 | Rosenthal | 74/89.15 X |

FOREIGN PATENT DOCUMENTS

| | | |
|---|---|---|
| A1-0162980 | 12/1985 | European Pat. Off. . |
| A1-0188863 | 7/1986 | European Pat. Off. . |
| 8600143 | 11/1986 | Netherlands . |

*Primary Examiner*—Allan D. Herrmann
*Attorney, Agent, or Firm*—Brian J. Wieghaus

[57] ABSTRACT

A driving mechanism having a spindle which is provided with a first helical threaded portion having a lefthand direction of rotation and with a second helical threaded portion having a righthand direction of rotation. A pair of spindle guides each engage a respective spindle threaded portion for rotating the spindle and translating the spindle in an axial direction. Each spindle guide has three pairs of runner rollers on a sleeve for centering and supporting the spindle within the sleeves. The three pairs of runner rollers on each sleeve kinematically constrain the six degrees of freedom of the spindle without overconstraint to reduce friction and binding of the spindle in the spindle guides.

38 Claims, 6 Drawing Sheets

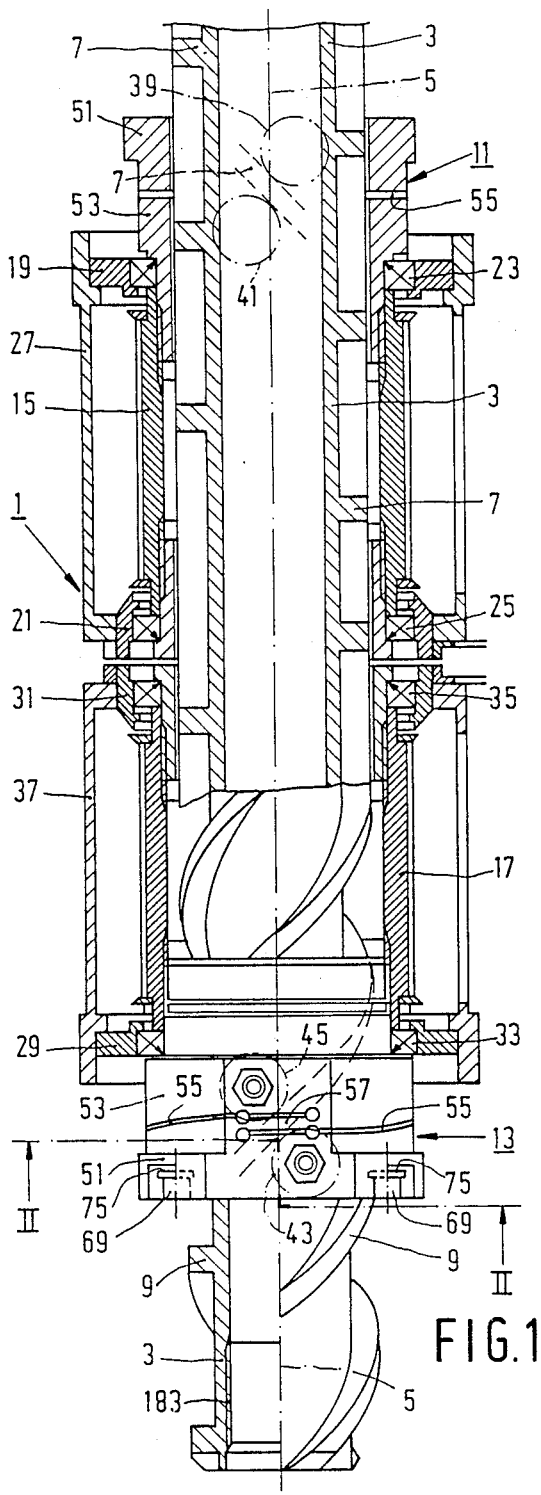
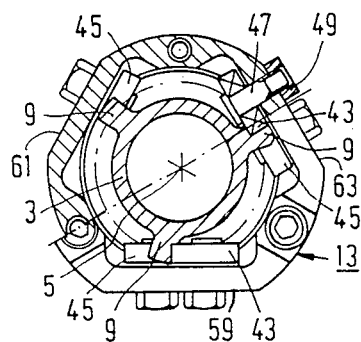
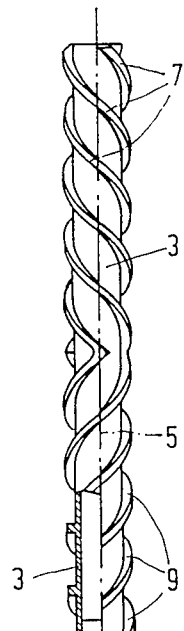
FIG.1
FIG.2
FIG.3

DRIVING MECHANISM AND MANIPULATOR COMPRISING SUCH DRIVING MECHANISM

This is a continuation of application Ser. No. 136,582, filed Dec. 22, 1987 now abandoned.

BACKGROUND OF THE INVENTION

The invention relates to a driving mechanism comprising a spindle, which is supported in at least one sleeve rotatable by means of a motor, is rotatable and displaceable with respect thereto and is provided with at least one helical guide, with which the sleeve is in engagement by means of a number of roller members.

The invention further relates to a manipulator comprising a driving mechanism of the kind mentioned in the opening paragraph.

The European patent application Ser. No. 1-0188863 discloses a manipulator or robot comprising a driving mechanism of the kind described hereinbefore. With the known driving mechanism, which is used in the said manipulator for displacing an end effector or gripper, a translation of the spindle is obtained via a number of balls (roller members) guided in an inner duct which is constituted by the helical guide of the spindle and a helical inner groove of the sleeve, which is adjoined by an outer duct, which is constituted by a helical outer groove of the sleeve and a cylindrical inner wall of a housing, in which the sleeve is journalled radially and axially. The sleeve acting as a nut is secured to a first pulley, which is coupled via a toothed belt to a first motor. A rotation of the spindle in the known driving mechanism is obtained by means of a further sleeve, which is arranged to surround the spindle and is provided with three axial grooves, which adjoin three corresponding axial grooves in the spindle so that a cage is formed for a number of balls which transmit a torque from the further sleeve to the spindle. The further sleeve is driven by a second motor via a second pulley and a second toothed belt. A simultaneous translation and rotation of the spindle is obtained by activating both the first and the second motor. A driving mechanism of the kind known from European patent application Ser. No. 1-0188863 is further described in European patent application Ser. No. 1-0162980. In the driving mechanism according to the last-mentioned European patent application, use is made of a sleeve acting as a nut and having a helical guide, which corresponds to the helical guide on the spindle.

A disadvantage of the known driving mechanisms is that due to the large number of contact points between the sleeve and the spindle a kinematically overconstrained construction is obtained, which can operate only with a sufficient amount of clearance between the sleeve and the spindle. The attainable positioning accuracy of the driving mechanism is thus comparatively low. In the case in which the driving mechanism is used in a manipulator, the said disadvantage becomes more pronounced because of the required repetition accuracy in manipulators. A further disadvantage of the known driving mechanism resides in the differences in construction of the mechanism for the translatory and rotary movement, respectively, of the spindle. This leads not only to a comparatively large number of component parts and a comparatively large mass inertia, but also requires a comparatively high power of the two motors.

SUMMARY OF THE INVENTION

An object of the invention is to provide a driving mechanism in which the said disadvantages are avoided.

For this purpose, the driving mechanism according to the invention is characterized in that the spindle is provided with a first multiple threaded helical threaded portion or guide having a lefthand direction of rotation and with a second multiple threaded helical threaded portion or guide having a righthand direction of rotation, which are in engagement with a first sleeve spindle guide rotatable by means of a motor and coaxial to the spindle and with a second sleeve spindle guide rotatable by means of a motor and coaxial to the spindle, respectively, each of the spindle guides being sleeves provided with three pairs of runner rollers in engagement with the first and the second guide spindle threaded portions respectively.

The invention is based on the recognition of the fact that the six degrees of freedom of a spindle essentially present can be constrained by means of six pairs of rollers, which are uniformly distributed over a multiple threaded helical guide having a righthand and a lefthand direction of rotation. The effect thus obtained is that a kinematically constrained construction is formed having a comparatively high repetition accuracy and a comparatively low friction, which is entirely free from clearance or has only a comparatively small amount of clearance. The construction is further very modular and is suitable for a so-called differential drive with a comparatively low motor power because both the translatory and the rotary movement of the spindle can be performed by means of two motors.

A particular embodiment of the driving mechanism having a construction comparatively compact in the axial direction of the spindle is further characterized in that the two helical thread portions are triple threaded, the three pairs of runner rollers of each sleeve being situated, viewed in the axial direction of the spindle, at the same level.

A further embodiment of the driving mechanism, in which a construction entirely free from clearance can be obtained, is further characterized in that each sleeve has two sleeve portions, which are partly separated from each other by a cut and are connected to each other by an elastically deformable bridge and which are relatively displaceable under spring force, one runner roller of one pair being situated on one sleeve portion and the other runner roller of the pair being situated on the other sleeve portion.

A still further embodiment of the driving mechanism, with which both a construction having a comparatively small mass and a construction without clearance is obtained, is characterized in that the one sleeve portion of the sleeve is coupled to the other sleeve portion by means of three bolts arranged between successive pairs of runner rollers, each of the bolts being prestressed by means of a spring located between a sleeve portion and the bolt.

Another compact embodiment of the driving mechanism, in which the pre-stress with which the runner rollers are pressed against the helical guide of the spindle can be adjusted and maintained comparatively accurately, is characterized in that the spring is a cup spring.

A still further embodiment of the driving mechanism offering a comparatively large freedom in the choice of the positions of the driving motors for the sleeves, is characterized in that the first and the second sleeve are secured to a first and a second pulley, respectively, which are coupled by means of a first and a second toothed belt, respectively, to a first and a second motor.

A further embodiment of the driving mechanism having a comparatively compact and direct drive of the sleeve is characterized in that the first and the second sleeve are coupled to a first and a second electric motor, an annular rotor magnet of each electric motor being secured to the relevant sleeve and being located within a stator provided with windings, while the rotor magnet and the associated stator are arranged coaxially and concentrically to the spindle.

A manipulator according to the invention, in which the driving mechanism according to the invention is conceptually fully integrated and in which the properties of the driving mechanism are utilized in a particular manner, is provided with a rod mechanism comprising at least two rods hinged to each other and an end effector or tool holder displaceable by a spindle supported by the rod mechanism, the rods being rotatable about a main axis which is at right angles to a plane in which the rods are displaced, while the tool holder coupled to the spindle is displaceable parallel to the center line of the spindle and is rotatable about said center line by means of a driving mechanism according to the invention supported by the rod mechanism and moving the spindle.

A particular embodiment of the manipulator is further characterized in that the first and the second sleeve of the driving mechanism are rotatable about a pivot shaft of two supporting rods of the rod mechanism hinged to each other, said rod mechanism comprising two pairs of rods constituted by the said pair of supporting rods and a pair of driving rods hinged thereto, the first sleeve being journalled in one of the supporting rods and the second sleeve being journalled in the other supporting rod.

BRIEF DESCRIPTION OF THE DRAWINGS

The invention will be described more fully with reference to the drawing, in which:

FIG. 1 is a longitudinal sectional view of a first embodiment of the driving mechanism, FIG. 2 is a partial cross-section of the driving mechanism shown in FIG. 1 taken on the line II—II at the area of a sleeve, FIG. 3 shows on a reduced scale a spindle partially cut through, which forms part of the driving mechanism shown in FIG. 1, FIG. 10 shows a manipulator as shown in FIG. 9 partially cut through.

DETAILED DESCRIPTION OF THE PREFERRED EMBODIMENT

Figure 4:
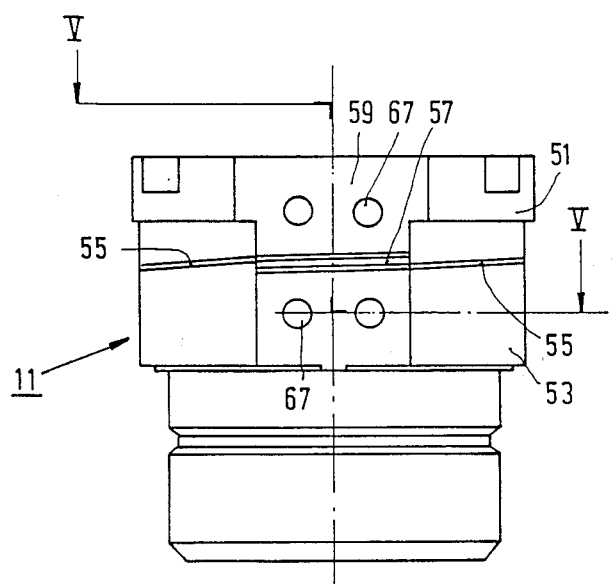
FIG. 4 is a longitudinal elevation of a sleeve used in the driving mechanism shown in FIG. 1.

The first embodiment of a driving mechanism 1 shown in FIG. 1 has a hollow spindle 3, which is rotatable about a shaft 5 coinciding with the center line or the longitudinal axis of the spindle. Besides a rotation about the shaft 5, the spindle 3 can also perform a translation along the shaft 5 in a manner to be described more fully. The said rotation and translation of the spindle 3 can take place both separately and simultaneously. As appears from FIGS. 1, 2 and 3, the spindle 3 is provided with a first triple threaded helical threaded portion or guide 7, which is indicated in sectional view in FIG. 1, and with a second triple threaded helical threaded portion or guide 9 shown in FIG. 1 partially in sectional view and in elevation. The direction of rotation of the first guide 7 is opposite (lefthand) to the direction of rotation of the second guide 9 (righthand). A first and a second sleeve acting as nuts 11 and 13 are arranged to surround the spindle 3 and these nuts are secured by means of screw-thread to cylindrical pulleys 15 and 17, respectively, also arranged to surround the spindle 3.

The sleeve 11 is rotatably journalled together with the pulley 15 in rings 19 and 21 by means of ball-bearings 23 and 25, the rings 19 and 21 being secured in a support 27. In a quite analogous manner, the sleeve 13 is rotatably journalled together with the pulley 17 in rings 29 and 31 by means of ball-bearings 33 and 35, the rings 29 and 31 being secured in a support 37.

Via three pairs of runner rollers 39,41 (only one pair indicated in FIG. 1 by dotted lines), the sleeve 11 acting as a nut is in engagement with the triple threaded helical guide 7 of the spindle 3. One pair of runner rollers 39,41 is associated with each thread. The sleeve 13 acting as a nut is likewise in engagement with the triple threaded helical guide 9 via three pairs of runner rollers 43,45 (cf. also FIG. 2). Each of the runner rollers 39,41, 43,45 is rotatably journalled in the associated sleeve on a journal 47, which is secured to the sleeve by a nut 49. The runner rollers are in the form of ball-bearings, whose outer race rolls over the guides 7 and 9. The identical sleeves 11 and 13 each have two sleeve portions 51,53, which are mutually separated by a number of cuts 55 and are connected to each other by means of a number of elastically deformable bridges 57. This is illustrated with reference to the sleeve 11, which is indicated in detail in FIGS. 4 to 7. For each thread one runner roller of each pair of runner rollers 39,41 and 43,45, respectively, is located on one sleeve portion, while the other runner roller is located on the other sleeve portion. Each of the sleeves 11 and 13 has three cuts 55 regularly distributed along the circumference of the sleeve, two successive cuts each time overlapping each other at the area of one of the bridges 57. The three pairs of runner rollers 39,41 and 43,45 of the sleeves 11 and 13, respectively, are secured in flat sides 59,61 and 63 of the sleeves, which can be seen especially in FIGS. 2 and 5. The flat sides 59, 61 and 63 facilitate the process of mounting the runner rollers.

Figure 5:
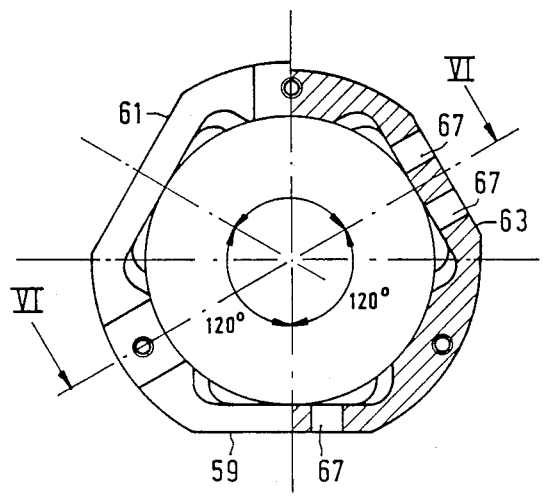
FIG. 5 is a cross-section of the sleeve shown in FIG. 4 taken on the line V—V.
Figure 6:
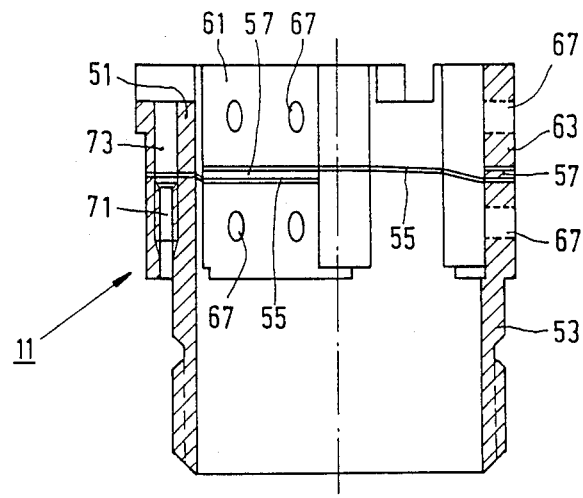
FIG. 6 is a longitudinal sectional view of the sleeve shown in FIG. 4 taken on the line VI—VI in FIG. 5.

As appears from FIGS. 5 and 6, mounting holes 67 for the journals 47 are provided in the flat sides 61,63,65. All the flat sides 59,61,63 are provided with four mounting holes 67 so that in the manufacture there is no difference between the sleeves 11 and 13. Each time two holes of the four mounting holes 67 per flat side are used for securing runner rollers. In the case of the sleeve 11, these holes are the holes denoted by reference numerals in FIGS. 4, 6 and 7. Between successive runner rollers in the circumferential direction and between successive flat sides 59,61 and 63 of a sleeve 11 or 13 are located mounting areas for bolts 69, of which only two out of three are shown in FIG. 1.

Figure 7:
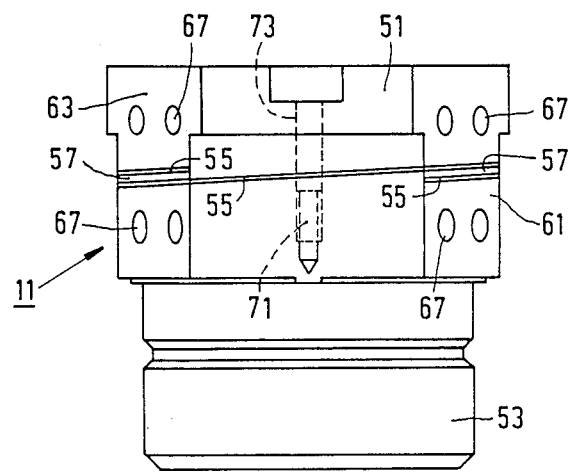
FIG. 7 is a longitudinal elevation of the sleeve shown in FIG. 4 in a position rotated through 180° with respect to the position in FIG. 4.

It appears from FIGS. 6 and 7 that the portion 53 of the sleeve 11 is provided with a threaded hole 71, in line with which a hole 73 is present in the sleeve portion 51. Each of the sleeves 11 and 13 is provided with three pairs of threaded holes 71,73, which are located at the areas at which the bolts 69 (cf. FIG. 1) have to be mounted. The bolts 69 are prestressed by means of a cup spring 75 between the head of the bolt and the sleeve portion 51. Thus, the force with which the runner rollers 39,41 and 43,45 engage the helical guides 7 and 9, respectively, can be adjusted. The elastically deformable bridges 57 ensure that the force exerted on the runner rollers 43 is not inadmissibly influenced by distance variations (due to manufacturing tolerances and differences in expansion coefficient) between the rotary shafts of a pair of runner rollers while maintaining a sufficiently high rigidity of the sleeve. The elastically deformable bridges 57 further ensure that the pairs of runner rollers can not jam during operation due to the manufacturing tolerances and differences in expansion coefficient between the material of the sleeves 11,13 and that of the spindle 3. Due to the elastically deformable bridges, the sleeve portions can perform small relative displacements, i.e. relative tilting movements and relative displacements parallel to the shaft 5.

In the case in which the pulleys 15 and 17 are provided with a toothing, they can be driven by a motor with the aid of a first and a second toothed belt, respectively, as will be described more fully hereinafter. Since the sleeves 11 and 13 are screwed to the pulleys 15 and 17, a rotation can thus be imposed on the sleeves 11 and 13 about the rotary shaft 5 (cf. FIG. 1). Depending upon the direction of rotation of the sleeves 11 and 13, a rotation, a translation or a simultaneous rotation and translation of the spindle 3 is obtained. If the sleeve 11 is rotated through an angle $\alpha$ (radians) about the rotary shaft 5, while the sleeve 13 is stationary, an axial displacement or translation of the spindle 3 is effected along the rotary shaft 5 over a distance $Z = \alpha/2 \times p/2\pi$, where p is the pitch of the helical guide 7. If the same should take place with the sleeve 13 while the sleeve 11 is stationary, the spindle 3 translates over a distance $Z = -\alpha/2 \times p/2\pi$. This means that, if both sleeves are rotated through an angle $\alpha$ in the same direction about the rotary shaft 5, no translation of the spindle 3 takes place, but a rotation about the rotary shaft 5 is obtained, the angle of rotation $\phi$ of the spindle is equal to $\alpha$. A translation of the spindle 3 without rotation can therefore be obtained by causing the sleeves 11 and 13 to rotate about the rotary shaft 5 in opposite senses. The spindle 3 is subjected to an axial displacement or translation $Z = \alpha \times p/2\pi$ if the sleeve 11 rotates through an angle $\alpha$ and the sleeve 13 rotates through an angle $-\alpha$. A simultaneous rotation and translation of the spindle 3 is obtained in that the sleeves 11 and 13 are caused to rotate in opposite directions about the rotary shaft 5 at different angular speeds. It is now already remarked that both the separate rotation or translation and the simultaneous rotation and translation are obtained by driving both sleeves. This means that a comparatively low motor power is sufficient, while moreover a socalled differential drive can be used, which is in principle electrically controlled in the manner described in European application No. 87200075.7 of the Applicant which corresponds to U.S. application Ser. No. 198,618 which is a continuation of Ser. No. 07/004,941, filed Jan. 20, 1987, now abandoned.

Figure 8:
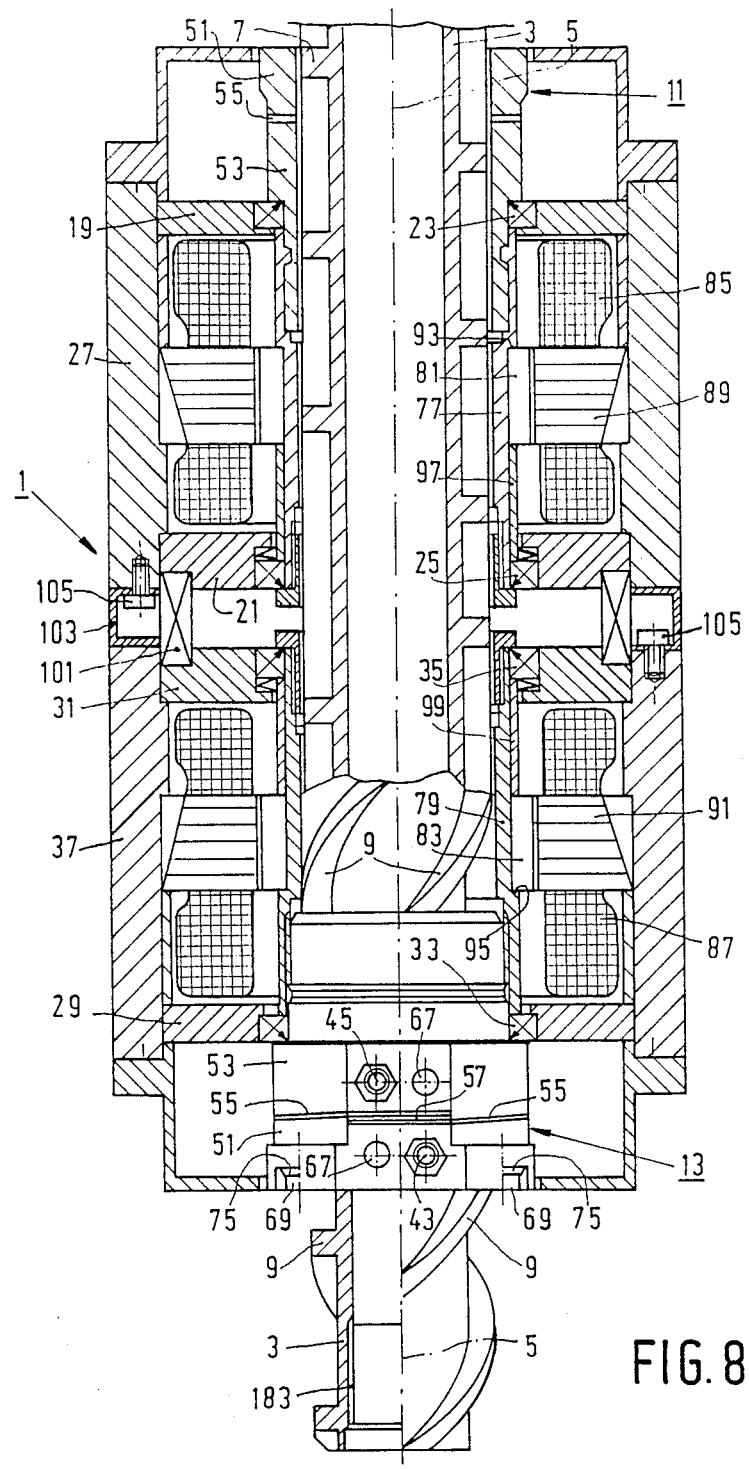
FIG. 8 is a longitudinal sectional view of a second embodiment of the driving mechanism.

In the second embodiment of a driving mechanism according to the invention shown in FIG. 8, use is made as far as possible of reference numerals corresponding to FIG. 1. The first sleeve 11 and the second sleeve 13 are screwed to a first tube 77 and to a second tube 79, respectively, on which are secured a first annular rotor magnet 81 and a second annular rotor magnet 83, respectively. The rotor magnets 81,83 are located within fixedly arranged stators 89 and 91 provided with windings 85 and 87, respectively. Thus, a first electrode motor is constituted by the rotor magnet 81, the winding 85 and the stator 89, while a second electric motor is constituted by the rotor magnet 83, the winding 87 and the stator 91. In the axial direction, the rotor magnets 81 and 83 are enclosed between shoulders 93 and 95 of the tubes 77 and 79, respectively, and spacer sleeves 97 and 99, respectively, engaging the ball-bearings 25 and 35, respectively. In the second embodiment of the driving mechanism 1 shown in FIG. 8, the supports 27 and 37 are relatively rotatable about the shaft 5 by means of a bearing 101 and can be secured to each other by means of a ring 103 of U-shaped cross-section and bolts 105. In the first embodiment of the driving mechanism shown in FIG. 1, the supports 27 and 37 can be rotated with respect to each other about the rotary shaft 5. Such a relative rotation can therefore also be obtained in the second embodiment shown in FIG. 8 in that the ring 103 and the bolts 105 are omitted. It will be explained more fully herinafter why a relative rotation between the supports 27 and 37 affords advantage.

In general, both the driving mechanism according to the first embodiment (cf. FIG. 1) and the driving mechanisms according to the second embodiment (FIG. 8) are particularly suitable for use in manipulators or robots of the type in which two or more rods hinged to each other are displaceable in a plane at right angles to a main axis and in which a translation and/or rotation of an end effector or gripper secured to one of the rods is desired. This translation then takes place parallel to the said main axis, while the rotation takes place about a rotary shaft parallel to the main axis. The axes of translation and of rotation may coincide. Especially if pole coordinates or cylinder coordinates are used in the track description and track programming of the end effector, it becomes evident that the driving mechanism according to the invention is excellently conceptually integrated in a manipulator in accordance with the invention. If such a manipulator is provided with a mechanism comprising four rods according to European patent application No. 87200075.7, due to the cylindrical working space then formed, a comparatively simple and rapid coordinate transformation is moreover obtained. Both the first driving mechanism shown in FIG. 1 and the second driving mechanism shown in FIG. 8 may be used in a manipulator according to the invention.

Figure 9:
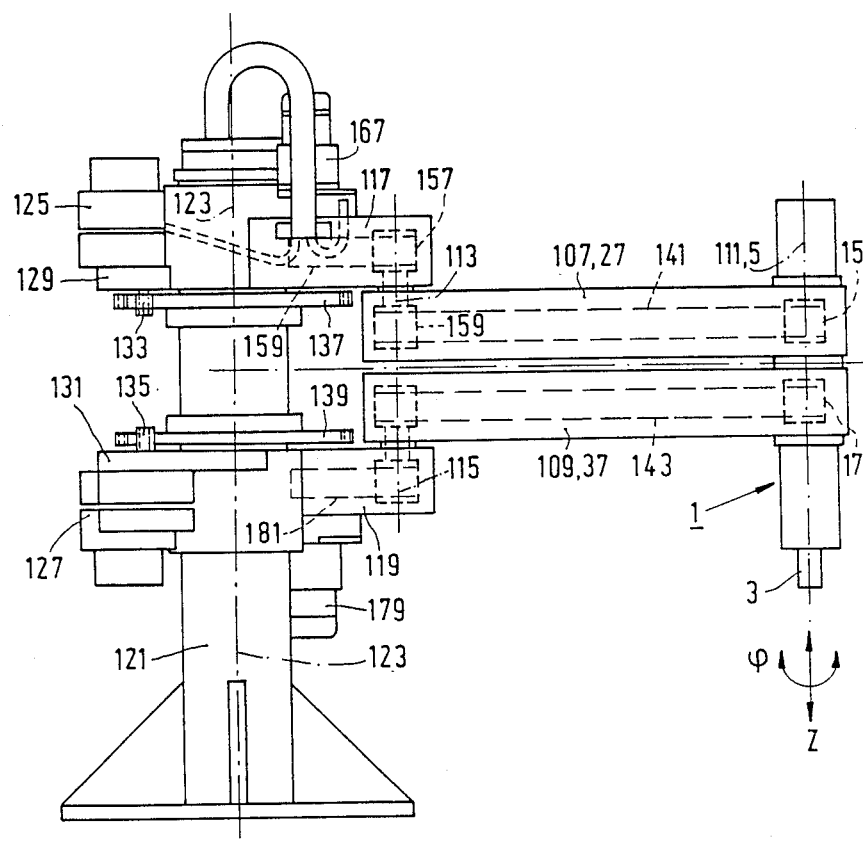
FIG. 9 is an elevation of a manipulator according to the invention comprising a driving mechanism according to the invention.
Figure 10:
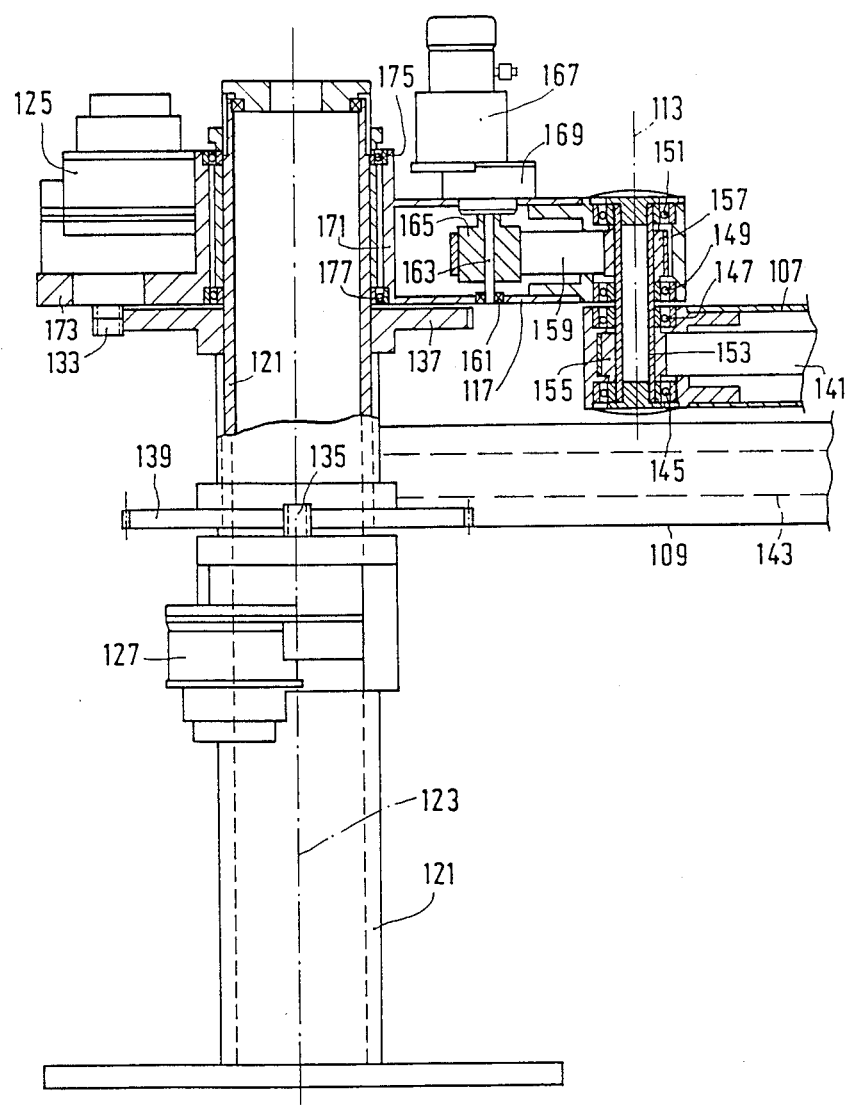

In the (first) embodiment of a manipulator according to the invention shown in FIGS. 9 and 10, in which the first embodiment of the driving mechanism shown in FIG. 1 is integrated, a supporting rod 107 and a supporting rod 109 constitute the support 27 and the support 37, respectively, of the driving mechanism shown in FIG. 1. The supporting rods 107 and 109 are hinged to each other along a pivot shaft 111, which coincides with the rotary shaft 5 of FIG. 1. At the area of further pivot shafts 113 and 115, the supporting rods 107 and 109 are hinged to a driving rod 117 and to a driving rod 119, respectively. Electric motors 125 and 127, which are rotatable about a vertical column 121 having a main axis 123, are secured to the driving rods 117 and 119, respectively, these electric motors driving a pinion 133 and a pinion 135, respectively, via mechanical reduction means 129 and 131, respectively. The pinions 133 and 135 are in engagement with the fixedly arranged gear wheels 137 and 139 secured to the column 121. The manipulator shown in FIGS. 9 and 10 is composed of a comparatively large number of identical components, such as: the supporting rods 107 and 109, the driving rods 117 and 119, the motors 125 and 127 and the mechanical transmissions between the motors and the identical gear wheels 137 and 139.

A first toothed belt 141 coupled with the pulley 15 (FIG. 1 and a second toothed belt 143 coupled with the pulley 17 are provided in the supporting rods 107 and 109, respectively. The toothed belts 141 and 143 are indicated by dotted lines in FIG. 9, while the toothed belt 141 is indicated in FIG. 10 by a full line and the toothed belt 143 is indicated in FIG. 10 by dotted lines. With reference to FIG. 10, the coupling of the first toothed belt 141 with the relevant drive is described. The drive of the second toothed belt 143 is effected in the same manner as that of the toothed belt 141, but is not shown further in FIG. 10. By means of ball-bearings 145, 147, 149 and 151, a pivot sleeve 153 is journalled so as to be rotatable about the pivot shaft 113 in the supporting rod 141 and the driving rod 117. Pulleys 155 and 157, with which are coupled the first toothed belt 141 and a third toothed belt 159, respectively, are secured on the pivot sleeve 153. A shaft 163 is rotatably journalled by means of a ball-bearing 161 in the driving rod 117. The shaft 163 is provided with a pulley 165, with which the third toothed belt 159 is coupled. By means of an electric motor 167, which is mounted on the driving rod 117, the shaft 163 is driven via a mechanical reduction means 169. The driving rod 117 is secured to a sleeve 171 having a flange 173, on which the electric motor 125 is mounted. The sleeve 171 is rotatably journalled on the column 121 by means of ball-bearings 175 and 177. The embodiment of the manipulator with pulleys of the driving mechanism driven by means of toothed belts described hereinbefore affords the advantage that the electric motors by which the toothed belts are driven can be arranged in the proximity of the column 121. Thus, the electric motor 167 is mounted in the proximity of the columns 121 on the driving rod 117, while an electric motor 179 (cf. FIG. 9) is also mounted in the proximity of the column 121 on the driving rod 119 for driving a fourth toothed belt 181.

In a particular (second) embodiment of a manipulator according to the invention, the driving mechanism shown in FIG. 8, in which the ring 103 and the bolts 105 are not present, is mounted on the supporting rods 107 and 109. The rings 21 and 23 and/or the supports 27 and 37 are then secured to the supporting rods 107 and 109 by means of a screw or weld joint. The supports 27 and 37 may also be integral with the supporting rods 107 and 109. The motors of the driving mechanism shown in FIG. 8 are now arranged rotationsymmetrically with respect to the rotary shaft 5 so that the toothed belts 141, 143, 159, 181 and the motors 167 and 179 may be dispensed with. Since the $Z-\phi$ and/or $\phi$—movement of the spindle 3 are invariably performed by means of two motors, these motors may be comparatively light and complete so that it is not objectionable for an important class of manipulators that the $Z-\phi$ drive of the spindle 3 is situated near the ends of the supporting rods 107 and 109. Due to the direct drive thus obtained, inertia effects and also clearance and friction are reduced. The drive of an end effector or gripper secured, for example, by means of a screw-thread 183 (cf. FIGS. 1 and 8) to the spindle 3 can take place with a comparatively high absolute accuracy. Of course, in the second embodiment of the manipulator according to the invention, the driving mechanism 1 of FIG. 9 is constituted by the mechanism shown in FIG. 1 so that an additional Figure to show this is not drawn.

A driving mechanism according to the invention is not limited to a construction having a spindle provided with triple threaded helical guides 7 and 9. A spindle with one double threaded guide having a righthand direction of rotation and with one double threaded guide having a lefthand direction of rotation is also possible. Two out of the three pairs of runner rollers per sleeve are located in this case at the same level in axial direction, while the third pair of runner rollers is located at a certain distance from the other two pairs. It is even possible to locate all three pairs of runner rollers at different axial levels. Such a mechanism requires a somewhat larger space in axial direction than the embodiment described with triple threaded guides, but lies entirely within the scope of the invention.

In principle, sleeves without cuts may be used if a sufficient amount of clearance is ensured. Since this amount of clearance should be as small as possible, this means, however, that comparatively narrow manufacturing tolerances should be taken into account. The sleeves 11 and 13 and the spindle are preferably made of an alloy of light metal, such as aluminium. The driving mechanism may be used in all those cases in which a $Z-\phi$ movement is required for the displacement of objects. By way of example, mention may be made of so-called transfer units. Due to the strongly modular construction of the driving mechanism comprising a comparatively large number of identical components, the mechanism can be manufactured at low cost in series production. The possibilities of maintenance and repair of such a mechanism are also considerably improved.

In principle, the advantages described also apply to a manipulator according to the invention, in which the driving mechanism according to the invention is entirely integrated. The rod mechanism of the manipulator comprising two or more rods or a quadrangle of rods may be displaceable as a whole along the column 121. For positioning of the end effector, the displacement of the rod mechanism along the column 121 may be incorporated in a coarse control, while the translation of the spindle may be incorporated in a fine control. The motors used may be electric, hydraulic or pneumatic motors.

The cup spring 75 may be replaced by helical springs. However, cup springs are to be preferred because of the compact construction that can be attained therewith and the relative insensitivity to distance variations between the runner rollers of a pair. If use is made of comparatively strong steel sleeves 11 and 13, the elastically deformable bridges 57 may be utilized to prestress the runner rollers 43.

In a manipulator comprising rods displaceable in a plane at right angles to a main axis, the driving mechanism according to the invention can be utilized in a particular manner to full advantage due to the fact that each position within a circular-cylindrical working space can be attained in a simple manner with the end effector. Especially in the manipulator of the kind described above comprising two pairs of rods, the use of the driving mechanism according to the invention is of particular advantage because the so-called track programming requires a comparatively simple coordinate transformation in cylindrical coordinates.

WHAT IS CLAIMED IS:

1. A driving mechanism, comprising:
   a spindle defining a spindle axis, said spindle comprising a first threaded portion having multiple helical threads with a lefthand sense and a second threaded portion having multiple helical threads with a righthand sense, said first and second threaded portions occupying separate axial lengths of said spindle, the threads of said first threaded portion having a first thread pitch and the threads of said second threaded portion having a second thread pitch, and each thread of said multiple threaded portions having opposing sidewalls;
   first and second spindle guides for guiding said spindle for rotation about said spindle axis and translation along said spindle axis, each spindle guide comprising
   a sleeve sized for receiving a respective threaded portion with a clearance fit, and
   three pairs of rollers arranged on said sleeve for centering and supporting a respective spindle threaded portion within said sleeve, the rollers of each roller pair being spaced from each other and oriented with respect to the spindle axis for guiding a corresponding thread between the rollers of the roller pair and along a helical path relative to said sleeve as defined by the thread pitch of said corresponding thread, and said rollers being rotatably mounted in said sleeve for providing rolling contact with the respective thread sidewalls,
   said spindle being inserted into said guides with said first threaded portion engaging said first spindle guide and said second threaded portion engaging said second spindle guide; and
   means for rotatably supporting said spindle guides at a fixed axial distance relative to each other such that each spindle guide guides a respective threaded portion,
   whereby for rotation of said spindle guides in the same direction as each other, with the rate of rotation of said first spindle guide relative to said second spindle guide equal to the ratio of said first thread pitch to said second thread pitch, said spindle being rotated without axial translation of said spindle,
   for rotation of said spindle guides in the opposite direction of each other, with the rate of rotation of said first spindle guide relative to second spindle guide equal to the ratio of said first thread pitch to said second thread pitch, said spindle being translated along said spindle axis without rotation, and
   for other combinations of rotation of said spindle guides, said spindle being translated along said spindle axis and being rotated about said spindle axis.

2. A driving mechanism as claimed in claim 1, wherein said means for supporting said spindle guides comprises a pair of housings, each spindle guide being rotatably supported in a respective housing, and first bearing means for allowing relative rotation of said housings coaxial with said spindle.

3. A driving mechanism as claimed in 1, wherein each threaded portion of said spindle is triple threaded and each roller pair engages a respective thread.

4. A driving mechanism as claimed in claim 3, wherein for each sleeve said three roller pairs are disposed at a same axial position.

5. A driving mechanism as claimed in claim 4, wherein said roller pairs on each sleeve are equiangularly spaced in the circumferential direction on said sleeves.

6. A driving mechanism as claimed in claim 5, wherein each sleeve comprises two axially adjacent sleeve portions, the rollers of each roller pair being oppositely disposed on respective sleeve portions, and means for resiliently connecting said adjacent sleeve portions for allowing resilient displacement of the rollers of each roller pair with respect to each other.

7. A driving mechanism as claimed in claim 6, wherein said means for resiliently connecting said sleeve portions comprises three elastically deformable bridges connecting said sleeve portions, said bridges connecting said sleeve portions between the rollers of each of said three roller pairs.

8. A driving mechanism as claimed in claim 7, wherein said sleeve comprises a sleeve wall, said sleeve portions are separated by a plurality of partial circumferential cuts through said sleeve wall, and each elastically deformable bridge comprises a circumferentially extending sleeve wall portion axially bound by a pair of axially spaced and circumferentially overlapping portions of said cuts.

9. A driving mechanism as claimed in claim 8, wherein said driving mechanism further comprises means for selectively rotating said first and second spindle guides for effecting translation and rotation of said spindle.

10. A driving mechanism as claimed in claim 8, wherein said sleeve portions are coupled to each other by three bolts arranged between successive pairs of rollers, each of the bolts being pre-stressed by means of a spring located between a sleeve portion and the bolt.

11. A driving mechanism in claim 10, wherein said spring is a cup spring.

12. A driving mechanism as claimed in claim 9, wherein said means for selectively rotating said first and second spindle guides comprises first and second toothed guide pulleys connected to said first and second spindle guides, respectively, and rotatably supported in a respective housing,
   a pair of motors, each having a toothed motor pulley, for driving a respective guide pulley, and
   a pair of belts for connecting each motor pulley to a respective guide pulley, said belts being toothed for meshing with said guide and motor pulleys.

13. A driving mechanism as claimed in claim 9, wherein said means for selectively rotating said first and second spindle guides comprises an electric motor arranged in each housing concentrically about said spindle, each electric motor comprising a tubular portion connected to a respective spindle guide, bearing means for supporting said tubular portion for concentric rotation about said spindle, an annular rotor magnet secured to said tubular portion, and an energizable stator secured to said housing and arranged coaxially with said rotor magnet for rotating said tubular portion and said spindle guide.

14. A driving mechanism as claimed in claim 1, further comprising means for selectively rotating said first and second sleeves for effecting translation and rotation of said spindle.

15. A driving mechanism as claimed in claim 14, wherein said means for selectively rotating said first and second spindle guides comprises first and second toothed guide pulleys connected to said first and second spindle guides, respectively, and rotatably supported in a respective housing,
 a pair of motors, each having a toothed motor pulley, for driving a respective guide pulley, and
 a pair of belts for connecting each motor pulley to a respective guide pulley, said belts being toothed for meshing with said guide and motor pulleys.

16. A driving mechanism as claimed in claim 14, wherein said means for selectively rotating said first and second spindle guides comprises an electric motor arranged in each housing concentrically about said spindle, each electric motor comprising a tubular portion connected to a respective spindle guide, bearing means for supporting said tubular portion for concentric rotation about said spindle, an annular rotor magnet secured to said tubular portion, and an energizable stator secured to said housing and arranged coaxially with said rotor magnet for rotating said tubular portion and said spindle guide.

17. A driving mechanism as claimed in claim 1, wherein each sleeve comprises two axially adjacent sleeve portions, the rollers of each roller pair being oppositely disposed on respective sleeve portions, and means for resiliently connecting said adjacent sleeve portions for allowing resilient displacement of the rollers of each roller pair with respect to each other.

18. A driving mechanism as claimed in claim 17, wherein said means for resiliently connecting said sleeve portions comprises three elastically deformable bridges connecting said sleeve portions, said bridges connecting said sleeve portions between the rollers of each of said three roller pairs.

19. A driving mechanism as claimed in claim 18, wherein said sleeve comprises a sleeve wall, said sleeve portions are separated by a plurality of partial circumferential cuts through said sleeve wall, and each elastically deformable bridge comprises a circumferentially extending sleeve wall portion axially bound by a pair of axially spaced and circumferentially overlapping portions of said cuts.

20. A driving mechanism as claimed in claim 19, wherein said sleeve portions are coupled to each other by three bolts arranged between successive pairs of rollers, each of the bolts being pre-stressed by means of a spring located between a sleeve portion and the bolt.

21. A driving mechanism as claimed in claim 20, wherein said spring is a cup spring.

22. A driving mechanism as claimed in claim 1, wherein said roller pairs on each sleeve are equiangularly spaced in the circumferential direction on said sleeves.

23. In a robotic manipulator having a base defining a main axis, a pair of parallel arms extending from said base transverse to said main axis pivotable with respect to each other at their ends remote from said base about a second axis parallel to said main axis, means for translating said arm ends in a radial direction with respect to said main axis and for rotating said arm ends in a circumferential direction about said main axis, wherein the improvement comprises:
 a driving mechanism supported at said arm ends, said driving mechanism comprising
 a spindle defining a spindle axis, said spindle comprising a first threaded portion having multiple helical threads with a lefthand sense and a second threaded portion having multiple helical threads with a righthand sense, said first and second threaded portions occupying separate axial lengths of said spindle, the threads of said first threaded portion having a first thread pitch and the threads of said second threaded portion having a second thread pitch, and each thread of said multiple threaded portions having opposing sidewalls;
 first and second spindle guides for guiding said spindle for rotation about said spindle axis and translation along said spindle axis, each spindle guide comprising
 a sleeve sized for receiving a respective threaded portion with a clearance fit, and
 three pairs of rollers arranged on said sleeve for centering and supporting a respective spindle threaded portion within said sleeve, the rollers of each roller pair being spaced from each other and oriented with respect to the spindle axis for guiding a corresponding thread between the rollers of the roller pair and along a helical path relative to said sleeve as defined by the thread pitch of said corresponding thread, and said rollers being rotatably mounted in said sleeve for providing rolling contact with the respective thread sidewalls,
 said spindle being inserted into said guides with said first threaded portion engaging said first spindle guide and said second threaded portion engaging said second spindle guide;
 means for rotatably supporting said spindle guides at a fixed axial distance relative to each other such that each spindle guide guides a respective threaded portion; and
 means for selectively rotating said first and second spindle guides for effecting rotation of said spindle about said second axis and translation of said spindle along said second axis,
 whereby for rotation of said spindle guides in the same direction as each other, with the rate of rotation of said first spindle guide relative to said second spindle guide equal to the ratio of said first thread pitch to said second thread pitch, said spindle being rotated without axial translation of said spindle,
 for rotation of said spindle guides in the opposite direction of each other, with the rate of rotation of said first spindle guide relative to second spindle guide equal to the ratio of said first thread pitch to said second thread pitch, said spindle being translated along said spindle axis without rotation, and
 for other combinations of rotation of said spindle guides, said spindle being translated along said spindle axis and being rotated about said spindle axis.

24. A manipulator as claimed in 23, wherein each threaded portion of said spindle is triple threaded and each roller pair engages a respective thread.

25. A manipulator as claimed in claim 24, wherein for each sleeve the three roller pairs are disposed at a same axial position.

26. A driving mechanism as claimed in claim 25, wherein said roller pairs on each sleeve are equiangularly spaced in the circumferential direction on said sleeves.

27. A manipulator as claimed in claim 26, wherein each sleeve comprises two axially adjacent sleeve portions, the rollers of each roller pair being oppositely disposed on respective sleeve portions, and means for resiliently connecting said adjacent sleeve portions for allowing resilient displacement of the rollers of each roller pair with respect to each other.

28. A driving mechanism as claimed in claim 27, wherein said means for resiliently connecting said sleeve portions comprises three elastically deformable bridges connecting said sleeve portions, said bridges connecting said sleeve portions between the rollers of each of said three roller pairs.

29. A manipulator as claimed in claim 28, wherein said sleeve comprises a sleeve wall, said sleeve portions are separated by a plurality of partial circumferential cuts through said sleeve wall, and said elastically deformable bridges comprise circumferentially extending sleeve wall portions each axially bound by respective pairs of axially spaced and circumferentially overlapping portions of said cuts.

30. A manipulator as claimed in claim 29, wherein said ends of said arms comprise a pair of housings in which said sleeves are mounted for rotation concentric with said spindle, and said means for selectively rotating said first and second sleeves comprises a toothed pulley rotatably supported within each housing concentric with said spindle and connected to a respective spindle guide.

31. A manipulator as claimed in claim 29, wherein said remote arm ends each comprise a housing, and said means for selectively rotating said first and second spindle guides comprises a pair of electric motors each arranged concentrically about said spindle in a respective housing, each electric motor comprising a tubular portion connected to a respective spindle guide, bearing means for rotatably supporting said tubular portion in said housing for concentric rotation about said spindle, an annular rotor magnet secured to said tubular portion, and an energizable stator fixed in said housing coaxially with said tubular portion and rotor magnet for rotating said tubular portion and said spindle guide.

32. A driving mechanism as claimed in claim 29, wherein said sleeve portions are coupled to each other by three bolts arranged between successive pairs of rollers, each of the bolts being pre-stressed by means of a spring located between a sleeve portion and the bolt.

33. A driving mechanism as claimed in claim 32, wherein said spring is a cup spring.

34. A manipulator as claimed in claim 23, wherein said remote ends of each arm comprise a housing in which said spindle guides are mounted for rotation, and said means for selectively rotating said first and second sleeves comprises a toothed pulley rotatably supported within each housing concentric with said spindle and connected to a respective spindle guide for driving said spindle guide.

35. A manipulator as claimed in claim 34, further comprising a tool holder fixed to an end of said spindle.

36. A manipulator as claimed in claim 23, wherein said remote arm ends each comprise a housing, and said means for selectively rotating said first and second spindle guides comprises a pair of electric motors each arranged concentrically about said spindle in a respective housing, each electric motor comprising a tubular portion connected to a respective spindle guide, bearing means for rotatably supporting said tubular portion in said housing for concentric rotation about said spindle, an annular rotor magnet secured to said tubular portion, and an energizable stator fixed in said housing coaxially with said tubular portion and rotor magnet for rotating said tubular portion and said spindle guide.

37. A manipulator as claimed in claim 36, further comprising a tool holder fixed to an end of said spindle.

38. A driving mechanism as claimed in claim 23, wherein said roller pairs on each sleeve are equiangularly spaced in the circumferential direction on said sleeves.

* * * * *